United States Patent
Obata et al.

(10) Patent No.: US 8,830,416 B2
(45) Date of Patent: Sep. 9, 2014

(54) LIQUID CRYSTAL DISPLAY DEVICE

(75) Inventors: Hiroshi Obata, Chiba (JP); Shimon Itakura, Mobara (JP); Tadatomo Akutsu, Chiba (JP); Takashi Kato, Chiba (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 798 days.

(21) Appl. No.: 12/878,146

(22) Filed: Sep. 9, 2010

(65) Prior Publication Data
US 2011/0063540 A1  Mar. 17, 2011

(30) Foreign Application Priority Data
Sep. 17, 2009  (JP) ................. 2009-215196

(51) Int. Cl.
G02F 1/13357 (2006.01)
G02F 1/1335 (2006.01)

(52) U.S. Cl.
CPC .......... *G02F 1/133608* (2013.01); *G02F 2001/133628* (2013.01); *G02F 1/133604* (2013.01)
USPC ............................. 349/58; 313/468; 362/382

(58) Field of Classification Search
None
See application file for complete search history.

(56) References Cited

U.S. PATENT DOCUMENTS

| | | | | |
|---|---|---|---|---|
| 5,907,218 A | * | 5/1999 | Altman et al. | 315/56 |
| 6,050,704 A | * | 4/2000 | Park | 362/260 |
| 6,459,203 B1 | * | 10/2002 | Kim | 315/56 |
| 2004/0027049 A1 | * | 2/2004 | Lee et al. | 313/486 |
| 2005/0281051 A1 | * | 12/2005 | Kim et al. | 362/613 |
| 2006/0092633 A1 | * | 5/2006 | Kim et al. | 362/225 |
| 2006/0197424 A1 | * | 9/2006 | Takata | 313/306 |
| 2008/0101074 A1 | * | 5/2008 | Ogura et al. | 362/382 |
| 2008/0165305 A1 | * | 7/2008 | Miyamoto | 349/58 |
| 2009/0256480 A1 | * | 10/2009 | Kim et al. | 313/624 |
| 2010/0117541 A1 | * | 5/2010 | Gray et al. | 315/149 |

FOREIGN PATENT DOCUMENTS

JP  2001-216807  8/2001

* cited by examiner

*Primary Examiner* — Tina Wong
(74) *Attorney, Agent, or Firm* — Antonelli, Terry, Stout & Kraus, LLP.

(57) ABSTRACT

Provided is a liquid crystal display device including a liquid crystal display panel, a fluorescent tube, a holder for retaining the fluorescent tube, and a frame to which the holder is attached. The holder includes an attachment portion for attaching to the frame, and a retaining portion for the fluorescent tube, the retaining portion extending from the attachment portion and facing the frame in a non-contact manner. The retaining portion and the frame have a space formed therebetween.

5 Claims, 5 Drawing Sheets

LIQUID CRYSTAL DISPLAY DEVICE

CROSS-REFERENCE TO RELATED APPLICATION

The present application claims priority from Japanese application JP 2009-215196 filed on Sep. 17, 2009, the content of which is hereby incorporated by reference into this application.

BACKGROUND OF THE INVENTION

1. Field of the Invention

The present invention relates to a liquid crystal display device.

2. Description of the Related Art

It is known that a fluorescent tube is used as a backlight of a liquid crystal display device (see Japanese Patent Application Laid-open No. 2001-216807). The fluorescent tube serves as a light source that converts ultraviolet rays generated through electric discharges into visible light beams by irradiating phosphors with the ultraviolet rays. Specifically, electrons released by the discharge collide with mercury atoms. Then, the mercury atoms receive energy from the electrons, and thus the ultraviolet rays are generated. In order that the fluorescent tube may emit light uniformly, it is desirable that the vaporized mercury atoms be dispersed uniformly therein.

Conventionally, a backlight of a general liquid crystal display device using a fluorescent tube has a structure in which, as described in Japanese Patent Application Laid-open No. 2001-216807, the fluorescent tube is retained by a holder at both end portions of the fluorescent tube. The holder is fixed to a frame formed of a metal. The frame serves as a base of the backlight. In this structure, heat of the fluorescent tube is transferred to outer portions thereof through the holder and the frame, and hence the portions of the fluorescent tube retained by the holder may be locally cooled. Mercury liquefies when temperature is decreased, and hence local cooling of the fluorescent tube interferes with uniform distribution of the mercury atoms in the fluorescent tube. As a result, uniform light emission may not be observed.

In the conventional holder for the fluorescent tube, heat retention at the end portions of the fluorescent tube is not considered, and hence there is a problem in that temperature distribution is generated particularly at the end portions of the fluorescent tube. Therefore, the dispersion of the mercury atoms becomes unequal, thereby interfering with uniform light emission.

SUMMARY OF THE INVENTION

The present invention has an object to provide a liquid crystal display device in which temperature distribution of a fluorescent tube used as a backlight of the liquid crystal display device is prevented from being generated.

(1) According to the present invention, a liquid crystal display device includes: a liquid crystal display panel; a fluorescent tube; a holder for retaining the fluorescent tube; and a frame to which the holder is attached, in which: the holder includes: an attachment portion for attaching to the frame; and a retaining portion for the fluorescent tube, the retaining portion extending from the attachment portion and facing the frame in a non-contact manner; and the retaining portion and the frame have a space formed therebetween. According to the present invention, the space is formed between the retaining portion and the frame, and hence heat may be prevented from being transferred from the fluorescent tube to the frame. Therefore, decrease in temperature at a contact portion between the fluorescent tube and the retaining portion may be prevented. As a result, temperature distribution of the fluorescent tube may be prevented from being generated, and uniform light emission may be achieved.

(2) In the liquid crystal display device described in Item (1), the fluorescent tube may include both end portions thereof and a curved portion formed between the both end portions, the fluorescent tube being formed so that the both end portions are arranged adjacent to each other. The holder may retain the both end portions. The retaining portion may include a first retaining portion for retaining one of the both end portions, and a second retaining portion for retaining another of the both end portions. The attachment portion may be disposed between the first retaining portion and the second retaining portion.

(3) In the liquid crystal display device described in Item (1) or (2), the retaining portion may retain the fluorescent tube so that at least a part of an outer side of an area where discharge of the fluorescent tube is generated is avoided from being retained.

DETAILED DESCRIPTION OF THE INVENTION

Figure 1:
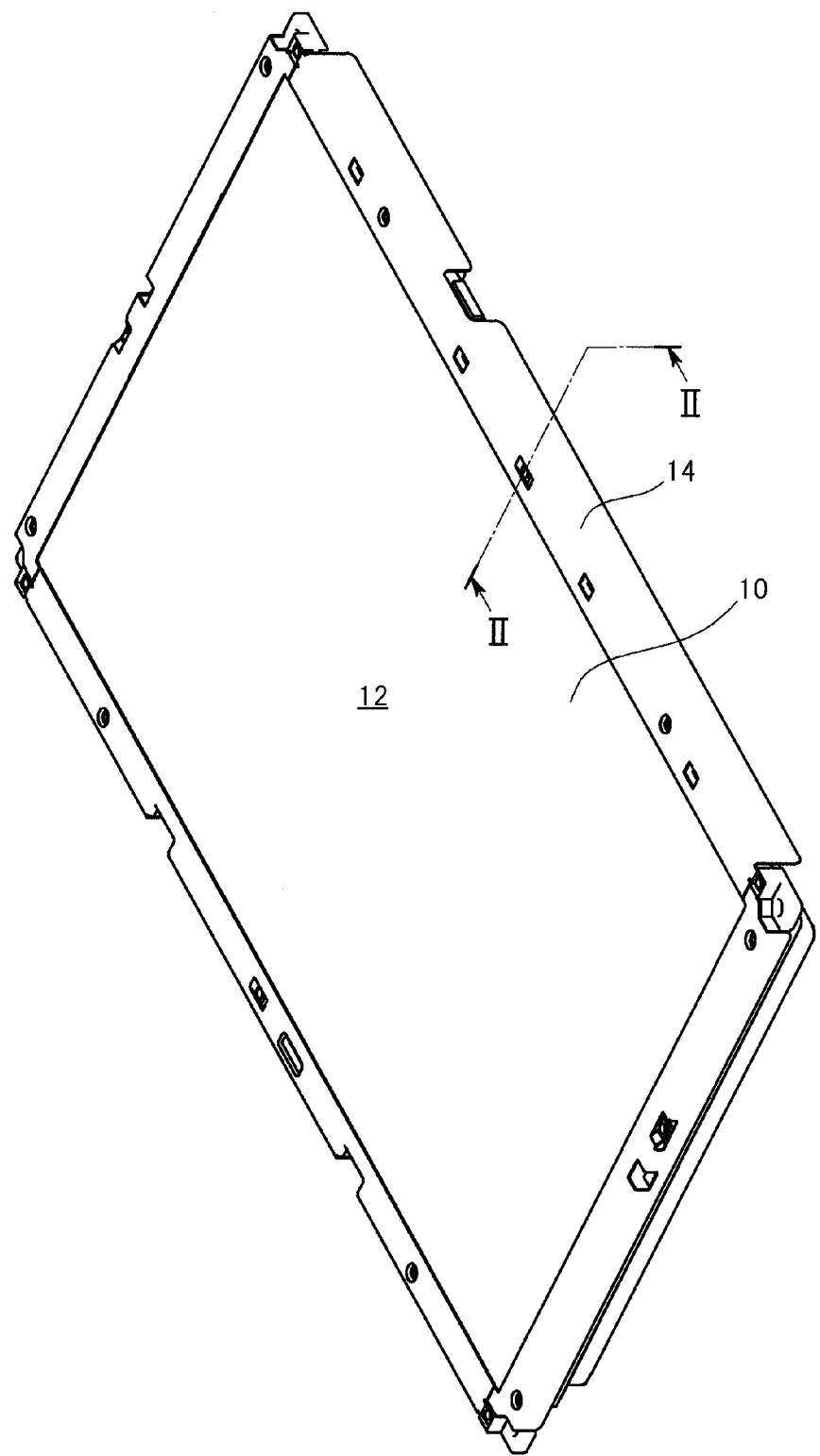
FIG. 1 is a perspective view illustrating a liquid crystal display device according to an embodiment of the present invention.
Figure 2:
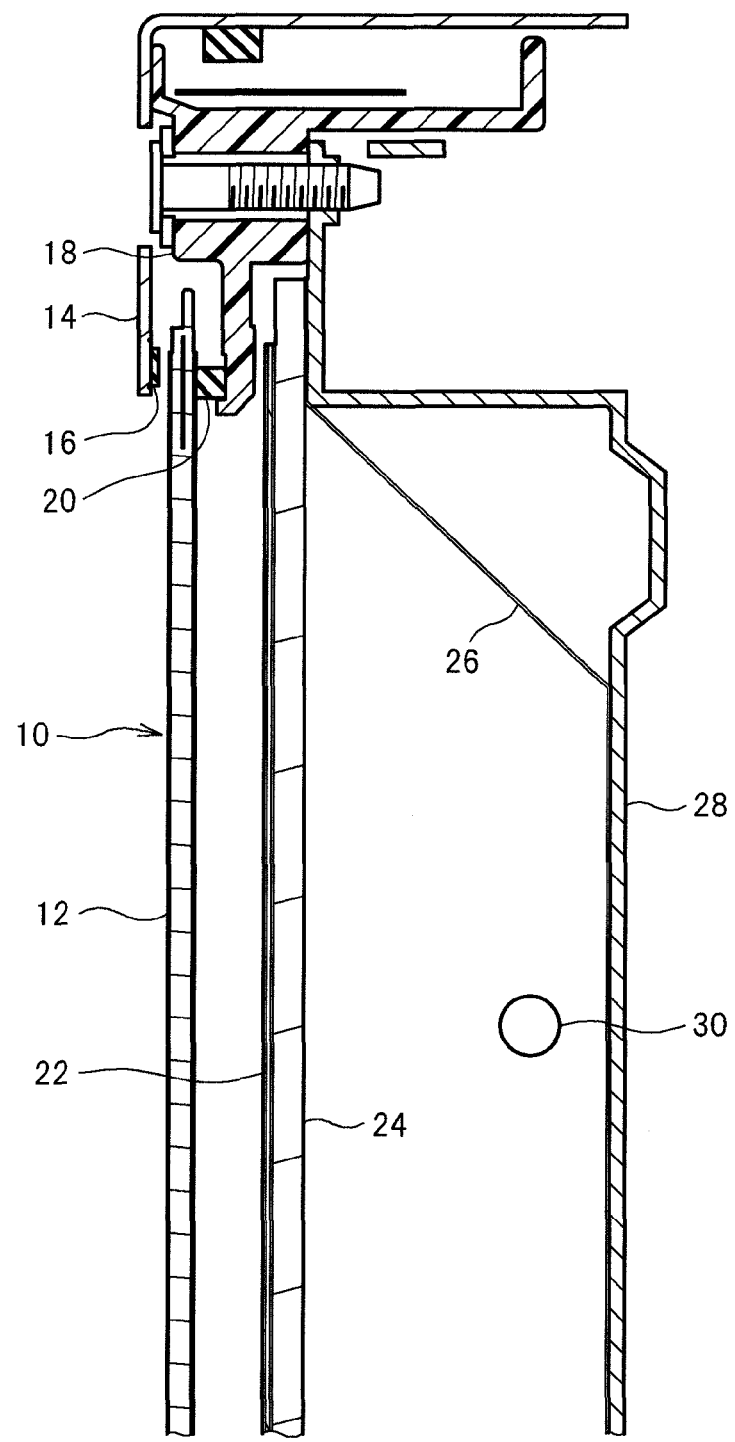
FIG. 2 is an enlarged view of a section of the liquid crystal display device taken along the line II-II of FIG. 1.

Hereinafter, an embodiment of the present invention is described with reference to the accompanying drawings. FIG. 1 is a perspective view illustrating a liquid crystal display device according to the embodiment of the present invention. FIG. 2 is an enlarged view of a section of the liquid crystal display device taken along the line II-II of FIG. 1.

The liquid crystal display device includes a liquid crystal display panel 10. A drive mode of the liquid crystal display panel 10 may be any mode such as an in-plane switching (IPS) mode, a twisted nematic (TN) mode, or a vertical alignment (VA) mode. Electrodes and wirings according to the mode are formed thereon.

A part of an upper frame 14 is faced to a peripheral edge portion of the liquid crystal display panel 10 on a display surface 12 (front surface) side. Therefore, the liquid crystal display panel 10 is prevented from being separated. The upper frame 14 is formed by assembling bar members in a rectangular shape. Each of the bar members has an L-shaped cross section as illustrated in FIG. 2. The upper frame 14 is formed of a metal. A first elastic body 16 is provided on the upper frame 14 so as to face the liquid crystal display panel 10. Because the first elastic body 16 is interposed between the liquid crystal display panel 10 and the upper frame 14, direct contact therebetween is prevented.

A part of an intermediate frame 18 is faced to the peripheral edge portion of the liquid crystal display panel 10 on a side opposite to the display surface 12 (rear surface side). A second elastic body 20 is provided on the intermediate frame 18 so as to face the liquid crystal display panel 10. Because the second elastic body 20 is interposed between the liquid crystal display panel 10 and the intermediate frame 18, direct contact therebetween is prevented. A gap between the first elastic body 16 and the second elastic body 20 is larger than a thickness of the liquid crystal display panel 10. Therefore, the liquid crystal display panel 10 is not fixed by the first elastic body 16 and the second elastic body 20, but movable in a direction perpendicular to the display surface 12.

A diffusion sheet 22 and a diffusion plate 24 are disposed on the rear surface side of the liquid crystal display panel 10 so as to overlap with the liquid crystal display panel 10. In addition, a reflection plate 26 is disposed on a side opposite to the liquid crystal display panel 10 of the diffusion plate 24.

The liquid crystal display device includes a lower frame 28. Rear surface sides of the liquid crystal display panel 10, the diffusion sheet 22, the diffusion plate 24, and the reflection plate 26 are covered with the lower frame 28. The intermediate frame 18 is disposed on a peripheral end portion of the lower frame 28, and the intermediate frame 18 is sandwiched between the upper frame 14 and the lower frame 28. Peripheral end portions of the diffusion sheet 22, the diffusion plate 24, and the reflection plate 26 are disposed between the peripheral end portion of the lower frame 28 and the intermediate frame 18.

Figure 3:
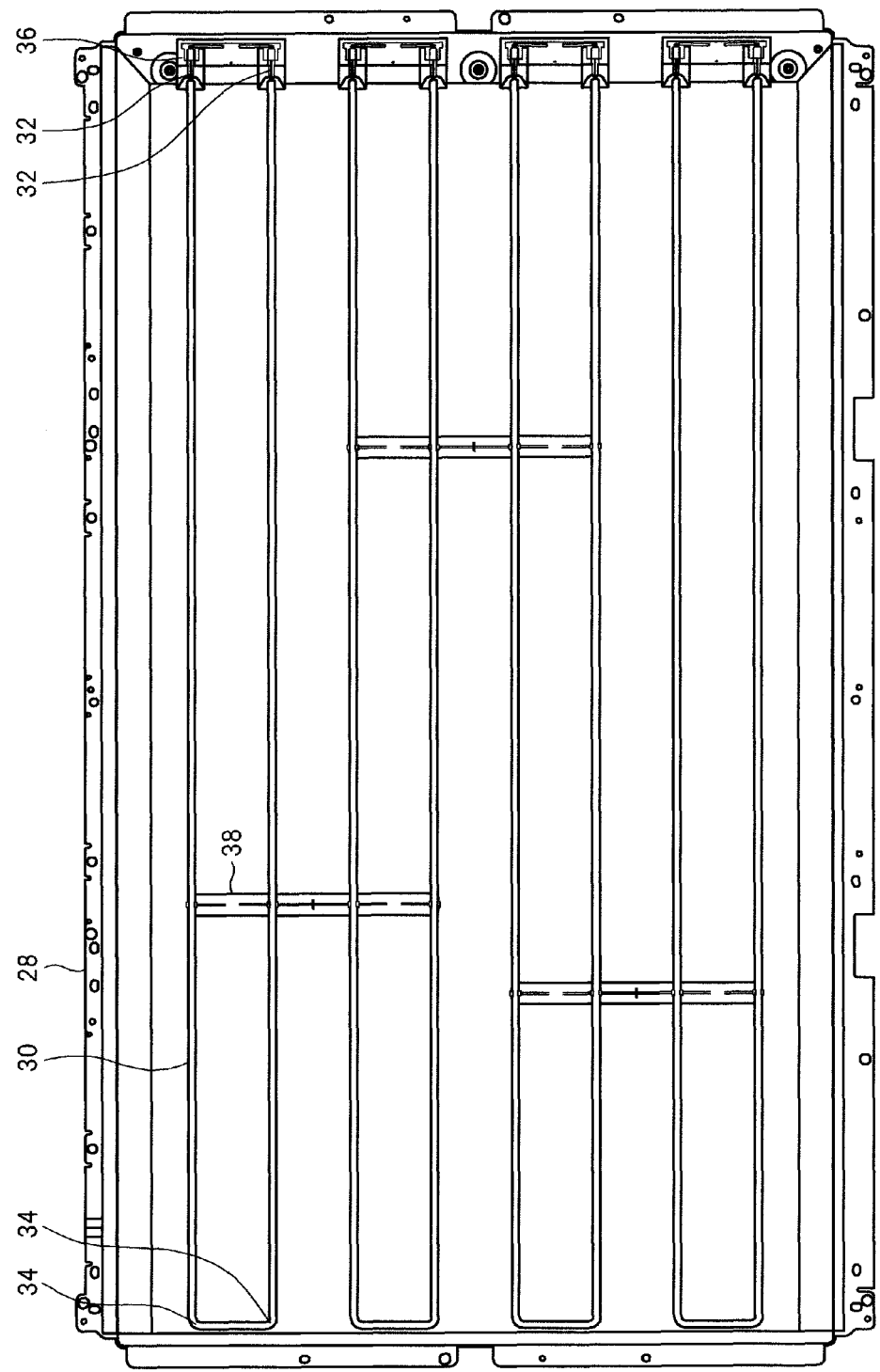
FIG. 3 is a plan view illustrating a structure in which an upper frame, a liquid crystal display panel, an intermediate frame, a diffusion sheet, and a diffusion plate are detached from the liquid crystal display device of FIG. 1.

FIG. 3 is a plan view illustrating a structure in which the upper frame 14, the liquid crystal display panel 10, the intermediate frame 18, the diffusion sheet 22, and the diffusion plate 24 are detached from the liquid crystal display device of FIG. 1.

The liquid crystal display device includes a fluorescent tube 30 (for example, cold cathode fluorescent lamp) as illustrated in FIGS. 2 and 3. The fluorescent tube 30 has gas (for example, inert gas such as neon-argon (Ne—Ar) gas) and mercury filled therein. The fluorescent tube 30 has a curved portion 34 between both end portions 32 thereof. In the example illustrated in FIG. 3, the fluorescent tube 30 has two curved portions 34 to form a squared U-shape. Alternatively, the fluorescent tube 30 may have one curved portion 34 to form a U-shape. The both end portions 32 of the fluorescent tube 30 are arranged to be adjacent to each other. The fluorescent tube 30 is retained by a holder 36. The holder 36 retains the both end portions 32 of the fluorescent tube 30. A portion of the fluorescent tube 30 other than the both end portions 32 is retained by an auxiliary holder 38 (also referred to as pin mold).

Figure 4:
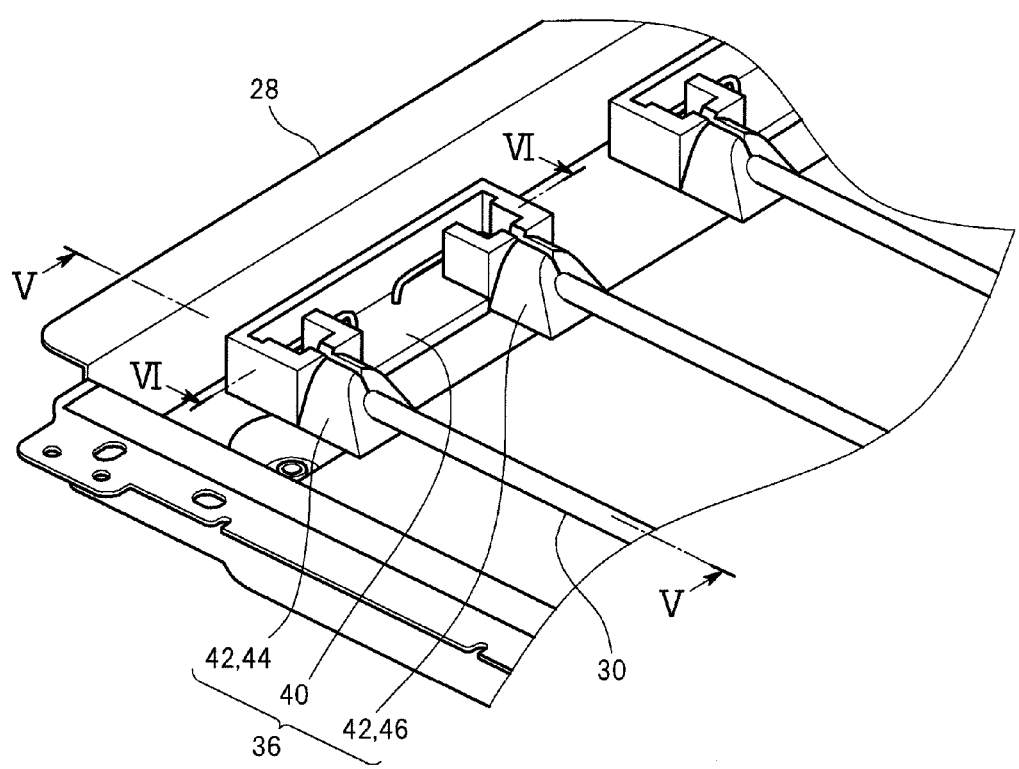
FIG. 4 is an enlarged perspective view of a fluorescent tube and a holder.
Figure 5:
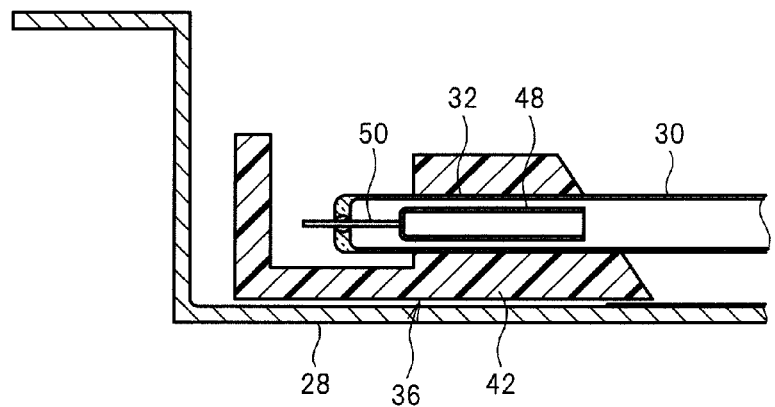
FIG. 5 is a cross sectional view illustrating the fluorescent tube and the holder taken along the line V-V of FIG. 4.
Figure 6:
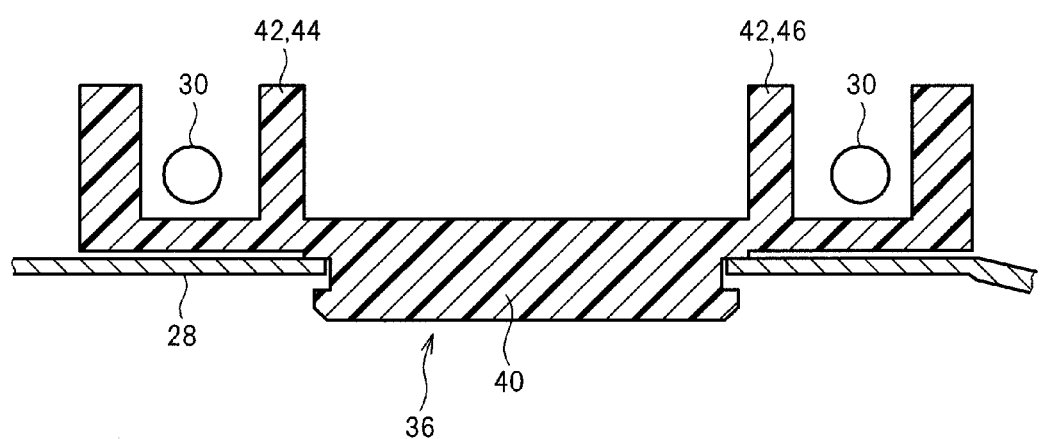
FIG. 6 is a cross sectional view illustrating the fluorescent tube and the holder taken along the line VI-VI of FIG. 4.

FIG. 4 is an enlarged perspective view of the fluorescent tube 30 and the holder 36. FIG. 5 is a cross sectional view illustrating the fluorescent tube 30 and the holder 36 taken along the line V-V of FIG. 4. FIG. 6 is a cross sectional view illustrating the fluorescent tube 30 and the holder 36 taken along the line VI-VI of FIG. 4.

The holder 36 is formed of an electrical insulator (for example, rubber such as silicone rubber or resin). Further, a material constituting the holder 36 is high in heat conductivity than air. The holder 36 is attached to the lower frame 28. The holder 36 has an attachment portion 40 for attaching to the lower frame 28. In the example illustrated in FIG. 6, the attachment portion 40 is provided within a gap between the both end portions of the fluorescent tube 30 adjacent to each other, and is disposed at a position where the attachment portion 40 does not overlap with the fluorescent tube 30. An attachment hole is formed in the lower frame 28, and the attachment portion 40 is fitted into the attachment hole. In this manner, the fluorescent tube 30 is fixed to the lower frame 28.

The holder 36 includes retaining portions 42 for the fluorescent tube 30, which are formed on both ends of the attachment portion 40. As illustrated in FIGS. 5 and 6, spaces are formed at portions between immediately beneath the retaining portions 42 and the lower frame 28. In other words, the retaining portions 42 and the lower frame 28 are not brought into contact with each other. In the example illustrated in FIG. 6, the retaining portions 42 include a first retaining portion 44 for retaining one end portion 32 of the fluorescent tube 30, and a second retaining portion 46 for retaining another end portion 32 thereof. The attachment portion 40 is disposed between the first retaining portion 44 and the second retaining portion 46.

FIG. 5 illustrates a cross sectional view of the fluorescent tube 30. The fluorescent tube 30 is a cold cathode fluorescent lamp having a discharge electrode 48 formed therein. A lead 50 is connected to the discharge electrode 48, and this lead 50 is pulled out from the fluorescent tube to be connected to an inverter (not shown). In the fluorescent tube 30, discharge is generated in a vicinity of the discharge electrode 48.

In this embodiment, the retaining portions 42 retain the fluorescent tube 30 so that at least a part of an outer side of an area where the discharge of the fluorescent tube 30 is generated (side of end portions of fluorescent tube) is avoided from being retained. In the area where the discharge is generated, even when there exists mercury in a liquid state, the mercury may be vaporized when temperature is increased by the discharge. On the other hand, little mercury in the liquid state may be vaporized on the outer side of the area where the discharge is generated because increase in temperature is small. Therefore, in this embodiment, the retaining portions 42 do not retain the fluorescent tube 30 (retaining portions 42 are not brought into contact with fluorescent tube 30) in a region where temperature does not increase much (that is, outer side of area of fluorescent tube 30 where discharge is generated) so as to prevent decrease in temperature.

In the example illustrated in FIG. 5, a shape of the retaining portions 42 is formed so that a tip of the fluorescent tube 30 in a direction opposite to a direction in which the discharge is generated is avoided from being retained. Specifically, the shape of the retaining portions 42 is formed so that a portion of the fluorescent tube 30 facing the lead 50 pulled out from the discharge electrode 48 is avoided from being retained. A boundary between a portion where the fluorescent tube 30 is retained by the retaining portion 42 and a portion where the fluorescent tube 30 is not retained by the retaining portion 42 is located at a position where the fluorescent tube 30 faces the discharge electrode 48.

According to this embodiment, an outer side of a portion of the fluorescent tube 30 facing the discharge electrode 48, where temperature does not increase much, and the retaining portion 42 are disposed in a non-contact manner, and a space is formed between the retaining portion 42 and the lower frame 28. Therefore, it is possible to reduce heat transfer from the fluorescent tube 30 to the lower frame 28 at the end portions 32 of the fluorescent tube 30 as much as possible, thereby preventing decrease in temperature at the end portions 32 of the fluorescent tube 30. As a result, temperature distribution of the fluorescent tube 30 may be prevented from being generated, and hence uniform light emission may be achieved.

The present invention is not limited to the embodiment described above, and various modifications may be made thereto. For example, the structure described in the embodiment may be replaced by a structure having substantially the same structure, a structure having the same action and effect, and a structure which may achieve the same object.

What is claimed is:

1. A liquid crystal display device, comprising:
    a liquid crystal display panel;
    a fluorescent tube;
    a holder for retaining the fluorescent tube; and
    a frame to which the holder is attached;
    wherein the holder includes:
        an attachment portion for attaching to the frame; and
        a retaining portion for the fluorescent tube, the retaining portion extending from the attachment portion and facing the frame in a non-contact manner;
    wherein the retaining portion and the frame have a space formed therebetween;
    wherein the attachment portion does not overlap with an area of the fluorescent tube retained by the retaining portion:
    wherein the fluorescent tube includes:
        a discharge electrode disposed inside the fluorescent tube; and
        a lead connected to the discharge electrode;
    wherein the retaining portion is formed so as to avoid retaining a portion of the fluorescent tube facing the lead;
    wherein the attachment portion does not overlap with the area of the fluorescent tube retained by the retaining portion at least when viewed in plan view from above the attachment portion and the retaining portion; and
    wherein the fluorescent tube has a boundary between a portion retained by the retaining portion and a portion not retained by the retaining portion, the boundary being located at a position where the fluorescent tube faces the discharge electrode.

2. The liquid crystal display device according to claim 1, wherein:
    the fluorescent tube includes:
        both end portions thereof; and
        a curved portion formed between the both end portions,
    the fluorescent tube being formed so that the both end portions are arranged adjacent to each other;
    the holder retains the both end portions;
    the retaining portion includes:
        a first retaining portion for retaining one of the both end portions; and
        a second retaining portion for retaining another of the both end portions; and
    the attachment portion is disposed between the first retaining portion and the second retaining portion.

3. The liquid crystal display device according to claim 1, wherein the retaining portion retains the fluorescent tube so that at least a part of an outer side of an area where discharge of the fluorescent tube is generated is avoided from being retained.

4. The liquid crystal display device according to claim 1, wherein:
    the frame has an attachment hole formed therein; and
    the attachment portion is fitted into the attachment hole.

5. The liquid crystal display device according to claim 1, wherein the retaining portion is formed so as to avoid retaining a tip of the fluorescent tube in a direction opposite to a direction in which discharge is generated.

* * * * *